United States Patent [19]

Christensen et al.

[11] Patent Number: 5,692,491

[45] Date of Patent: Dec. 2, 1997

[54] UNGLAZED TRANSPIRED SOLAR COLLECTOR HAVING A LOW THERMAL-CONDUCTANCE ABSORBER

[75] Inventors: Craig B. Christensen, Boulder; Charles F. Kutscher, Golden; Keith M. Gawlik, Boulder, all of Colo.

[73] Assignee: Midwest Research Institute, Kansas City, Mo.

[21] Appl. No.: 639,852

[22] Filed: Apr. 19, 1996

[51] Int. Cl.[6] .................................. E04D 13/18; F24J 2/48
[52] U.S. Cl. .......................... 126/628; 126/676; 126/569; 126/633
[58] Field of Search .................................. 126/628, 621, 126/624, 625, 629, 674, 675, 677, 676, 569, 633

[56] References Cited

U.S. PATENT DOCUMENTS

| 4,058,109 | 11/1977 | Gramm | 126/674 X |
| 4,324,231 | 4/1982 | Reinert | 126/674 |
| 4,392,008 | 7/1983 | Cullis et al. | 126/674 X |
| 4,429,545 | 2/1984 | Steinberg | |
| 4,774,932 | 10/1988 | Hollick | |
| 4,899,728 | 2/1990 | Peter et al. | |
| 4,934,338 | 6/1990 | Hollick et al. | |

FOREIGN PATENT DOCUMENTS

| 8102154 | 12/1982 | Netherlands | 126/674 |

OTHER PUBLICATIONS

NREL Technology Brief, NREL/MK-336-6702, *Solar-Heated Fresh Air Cuts Heating Costs*, Nov. 1994.

Primary Examiner—Larry Jones
Attorney, Agent, or Firm—Edna M. O'Connor; Ken Richardson

[57] ABSTRACT

An unglazed transpired solar collector using solar radiation to heat incoming air for distribution, comprising an unglazed absorber formed of low thermal-conductance material having a front surface for receiving the solar radiation and openings in the unglazed absorber for passage of the incoming air such that the incoming air is heated as it passes towards the front surface of the absorber and the heated air passes through the openings in the absorber for distribution.

20 Claims, 3 Drawing Sheets

UNGLAZED TRANSPIRED SOLAR COLLECTOR HAVING A LOW THERMAL-CONDUCTANCE ABSORBER

The United States Government has rights in this invention under Contract No. DE-AC3683CH1009383CH10093 between the U.S. Department of Energy and the National Renewable Energy Laboratory, a Division of Midwest Research Institute.

BACKGROUND OF THE INVENTION

The instant invention is directed to an unglazed transpired solar collector having a low thermal-conductance absorber. An unglazed transpired solar collector system includes an unglazed solar collector having an absorber panel of dark perforated material. Typically, the absorber is positioned to face south, southeast or southwest for maximum sun exposure. The dark absorber panel absorbs solar radiation and heats incoming air that is then drawn through its perforations, holes, or interstices, into a plenum or air collection space behind the panel. Fans are typically used to pull or suction the outside air in through the perforations and to distribute the air as required for the particular use.

Unglazed solar collectors are shown in U.S. Pat. Nos. 4,774,932 and 4,934,338 to Hollick and Hollick et at, and U.S. Pat. No. 4,899,728 to Peter et al. The three patents disclose preheating ventilation air for a building. Specifically, U.S. Pat. Nos. 4,774,932 and 4,934,338 disclose a corrugated collector panel. Air passes along the channels of the corrugated collector panel and is heated by a combination of solar heat from the panel and heat loss from the interior of the building as the air passes through the panel. The collector panel is typically formed of metal as it was thought necessary to use a high thermal-conductance material.

The system of U.S. Pat. No. 4,899,728 similarly relies on heating the panel by a combination of solar radiation and heat loss from the interior of the building.

For solar collector absorbers, thermal conductance (c) is defined as the product of the thermal conductivity (k) and the thickness (t) of the material. This definition of conductance with units of W/°C. is appropriate for heat conduction along the plate, parallel to the surface, as in a solar collector absorber. (Another definition of conductance with units of W/°C.-m$^2$, the ratio of conductivity to thickness, is applicable to heat conduction perpendicular to the surface of a wall, not parallel to a surface).

In the past, for non-transpired solar collectors, absorbers have typically been constructed of high thermal-conductivity materials such as copper or aluminum. Otherwise, portions of the absorber would operate at higher temperatures, lose more heat, and lead to reduced overall collector efficiency. The exceptions (where absorber thermal conductance is not critical) are cases where the heat transfer fluid (liquid or air) contacts the entire absorber area (i.e., "fully wetted") e.g., some swimming pool unglazed collector designs and some air-heating glazed collector designs.

For unglazed transpired solar collectors, it was expected that the collector efficiency would depend on absorber thermal conductance, because the absorber is not "fully wetted.". The suction air is only directly in contact with the absorber in the vicinity of the holes. A boundary layer of air builds up on the surface of the absorber between the holes and inhibits heat transfer from the absorber to the suction air. Therefore, the absorber in these regions will operate at higher temperatures and have higher heat losses than the regions near the holes. This is especially true because the transpired collector is unglazed and loses heat primarily by infrared radiation to the surroundings. It was expected that a relatively high thermal-conductance absorber would be necessary to conduct the heat laterally through the absorber from between the holes to the vicinity of the holes where there is good convective heat transfer.

For typical sheeting thicknesses, aluminum (c=2.2×10$^{-1}$ W/°C., t=0.001 m, k=216 W/°C.-m) has high thermal conductance compared to steel (c=1.8×10$^{-2}$ W/°C., t=0.00038 m, k=47 W/°C.-m) which, in the past was generally considered not as effective as absorber material for an unglazed transpired solar collector. Typically, commercial installations to date have utilized aluminum absorbers for unglazed transpired solar collector.

NREL Technology Brief, NREL/MK-336-6702 further indicated that past research efforts were directed to maximizing the amount of heat picked up by the air as it passed through the holes. Therefore it was expected that materials with relatively high thermal conductance would be needed to achieve reasonable efficiencies.

In the past, it was also expected that if the absorber was corrugated, the "ridges" would shield the "valley" areas on the absorber surface from cross winds and reduce convective heat losses.

The problem with current day absorbers, including unglazed transpired collector absorbers, is that they are expensive due to cost of materials, manufacturing, and installation. Some low thermal-conductance materials such as the plastic, fabrics or metal foils of the instant invention offer a reduction in overall cost. In some situations such as crop drying and temporary building heat, permanent installation may not be needed, and some low thermal-conductance materials such as the plastics or fabrics of the instant invention offer ease of installation and potential reduction in weight and cost.

SUMMARY OF THE INVENTION

It is an object of the instant invention to provide a low-cost, unglazed, transpired solar collector suitable for permanent and temporary applications.

It is a further object of the instant invention to provide an absorber for an unglazed transpired solar collector wherein the absorber is formed of low thermal-conductance material.

It is a further object of the instant invention to provide an unglazed transpired solar collector having an absorber formed of flexible, easy to store continuous sheet plastic material.

It is an additional object of the invention to provide an unglazed transpired solar collector having a perforated or porous flat absorber with good air heating results.

The instant invention is directed to an unglazed transpired solar collector having a plenum or air collection area and a perforated or porous absorber plate. The collector is unglazed and the perforated or porous absorber plate receives solar radiation to heat the air which is then suctioned therethrough to the air collection chamber or plenum. The perforated or porous absorber is formed of low cost, low thermal-conductance continuous sheet material. Such material may be rigid or flexible (rollable), for ease of storage. The unglazed transpired solar collector heats the air as it is pulled towards the surface of the absorber. The heated air is then pulled through the openings in the absorber and into the air collection chamber. The unglazed transpired solar collector is suitable for temporary applications and the lightweight absorber can be stretched over various frames or supports to suit the application. It can also be fixedly attached to a more permanent support structure.

DETAILED DESCRIPTION OF THE INVENTION

Figure 1:
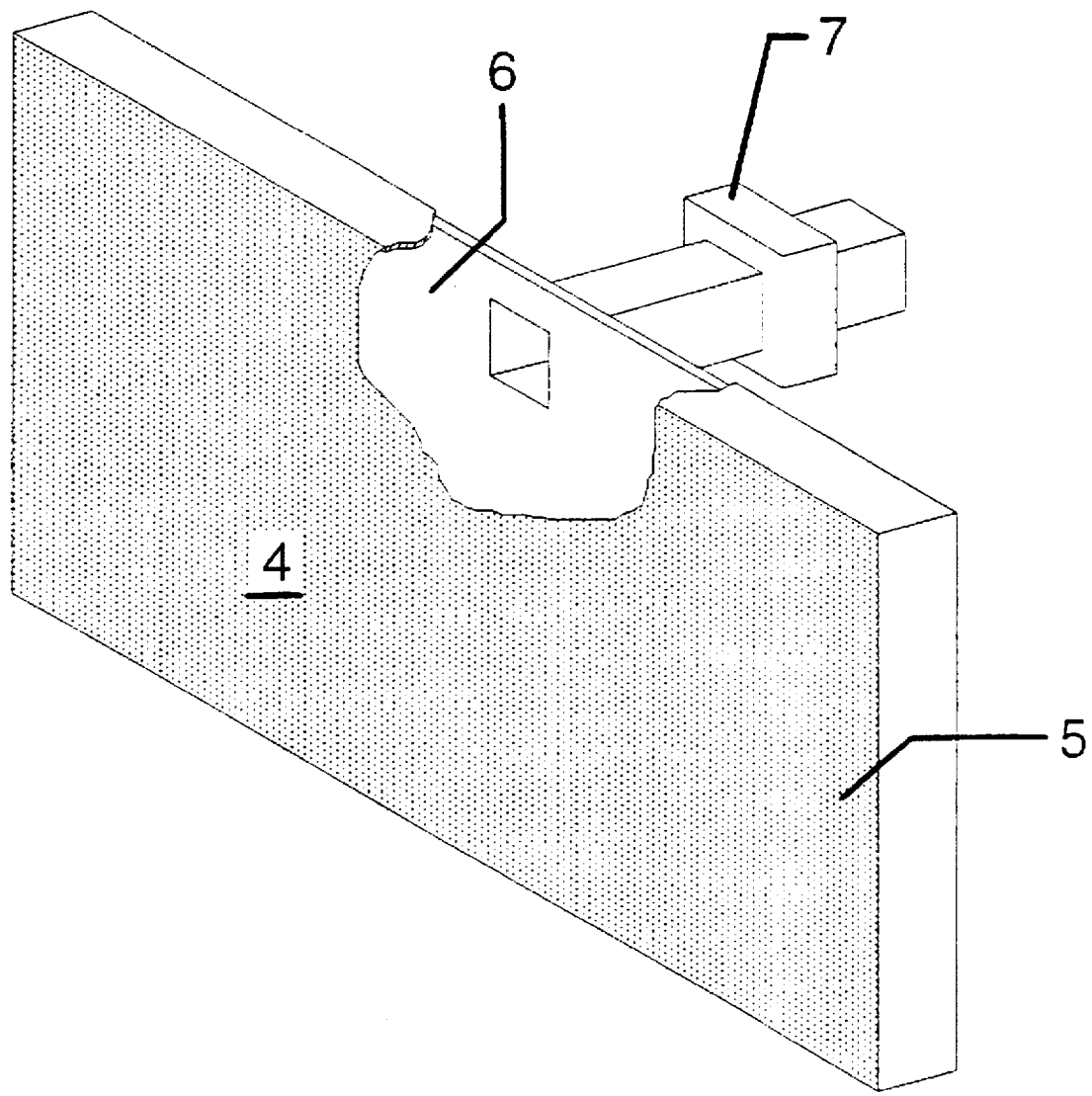
FIG. 1 is a perspective with cut away portion showing the basic unglazed transpired solar collector.

The instant invention is directed to an unglazed transpired solar collector having a flat plate absorber. A perspective, with cut away portion of the unglazed transpired solar collector is shown in FIG. 1. The panel is formed of a front absorber plate 5 having openings for passage of air. The plate 5 is of low thermal-conductance material having a thermal conductance of less than $1.0 \times 10^{-2}$ W/°C. The front surface of the plate 5 preferably is not corrugated but flat or substantially planar.

Behind the front absorber plate is an air collection chamber or plenum 6. Surfaces of the air collection chamber or plenum may be treated or coated to have a low emittance for infrared radiation. A fan 7, is typically used to suction air through the openings of the absorber and into the air collection chamber. The fan 7 can also pull air out of the air collection chamber 6 for distribution.

The absorber plate 5 of the instant invention is formed of low thermal-conductance material. For solar collector absorbers, thermal conductance (c) is defined as the product of the thermal conductivity (k) and the thickness (t) of the material. This definition of conductance with units of W/°C. is appropriate for heat conduction along the plate, parallel to the surface, as in a solar collector absorber.

The instant invention illustrates that unglazed transpired solar collectors with low thermal-conductance absorbers can operate with high efficiencies. This unexpected result is apparently due to a combination of factors. The regions between the holes do, in fact, reach somewhat higher temperatures, but the absorber temperatures near the holes are lower than for an absorber with higher thermal conductance. So, the overall average absorber temperature and the associated infrared heat loss to the surroundings are not necessarily significantly higher. The non-linear radiation effects resulting from non-uniform absorber temperatures were expected to decrease efficiency (even with the same overall average absorber temperature), but the increase in radiation losses is limited because the absolute temperature of the absorber is not very high.

Thermal conductance can be very low without significantly affecting the efficiency. The instant invention shows unexpectedly that materials with thermal conductances such as thin polyethylene plastic films ($c = 3.3 \times 10^{-5}$ W/°C., $t = 0.0001$ m, $k = 0.33$ W/°C.-m) can be efficiently used as absorbers in unglazed transpired solar collectors. It is also expected that absorbers having a thermal conductance of less than $1.0 \times 10^{-2}$ W/°C. would be efficient in unglazed transpired solar collectors.

Experimental Approach

To investigate the effect of absorber thermal conductance on the efficiency of unglazed transpired solar collectors, the heat transfer effectiveness of a number of perforated plates was measured. The experiments were conducted at an unglazed transpired collector test facility consisting of a wind tunnel, test box, and lamp array. The open-loop wind tunnel was designed and built specifically for heat transfer measurements on unglazed transpired collector absorber plates. The test box provides for test plate mounting and suction air flow measurements. The lamp array consists of sixteen 300 W lamps and is used to heat the absorber plate.

Results are given here for two cases, including an absorber plate formed of aluminum ($c = 3.5 \times 10^{-1}$ W/°C., $t = 0.0016$ m, $k = 216$ W/°C.-m), and an absorber plate formed of styrene plastic ($c = 2.6 \times 10^{-4}$ W/°C., $t = 0.0016$ m, $k = 0.16$ W/°C.-m).

Figure 2:
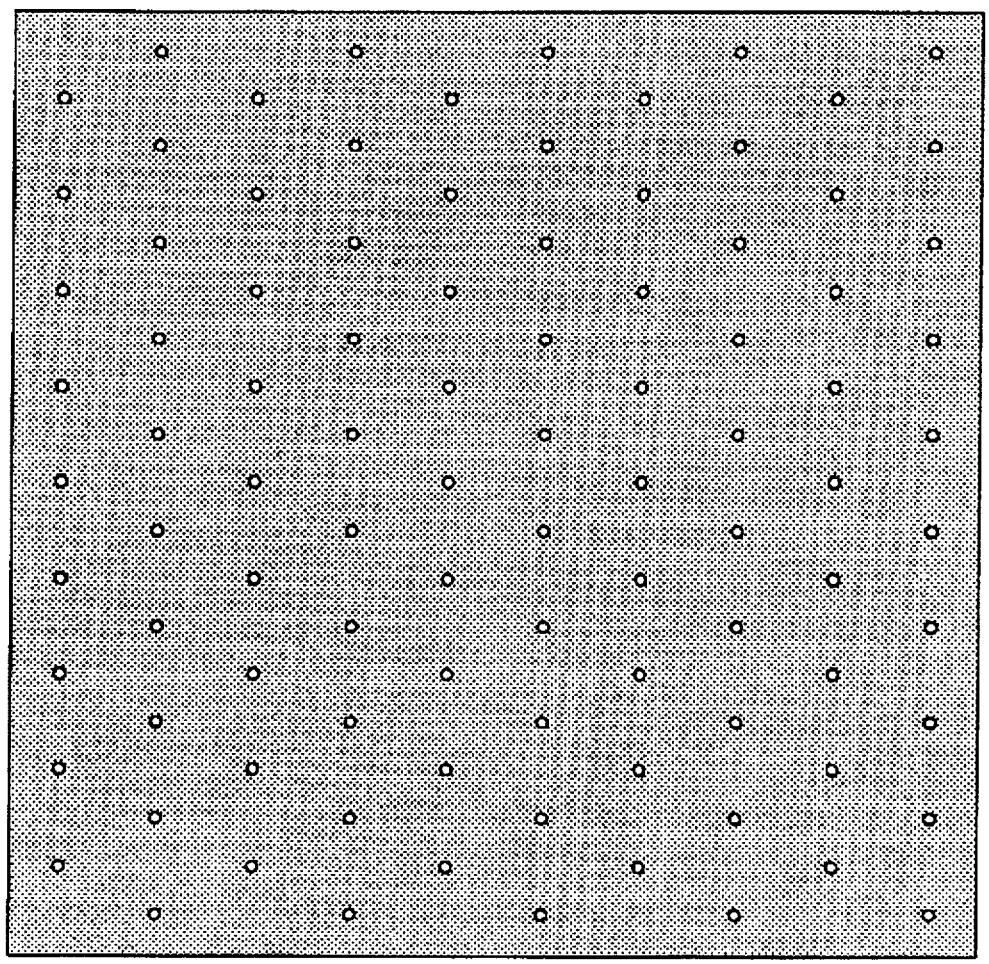
FIG. 2 is a detail of a perforated absorber surface.

The holes in the plastic plate were center punched, and then drilled with a sharp drill to prevent galling and burr formation. The back side of the plate was further sanded by hand to eliminate any residual burrs. The plastic plate had the holes distributed similar to FIG. 2 although it is realized that other configurations could be used. The aluminum plate was punched by a numerically controlled punching machine to also be similar to FIG. 2. The pitch (center-of-hole to center-of-hole distance) for both the plastic and aluminum plates was 0.0135 m, and the hole diameter was 0.0032 m.

Both plates were lightly sanded on both sides and cleaned with degreasers. Compressed air was blown over the plates to clear the plates of any towel lint. Both plates were spray painted by hand with Krylon brand flat black paint. The cans of paint were from the same lot to reduce error from lot-to-lot variation, and both plates had multiple coats of the paint. For the final coat, both plates received paint from the same can.

The plates were mounted on an instrumented test box. For each plate, at least 30 points were used to obtain the average values of ambient temperature ($T_{amb}$), mass flux (G), outlet temperature ($T_{out}$), and heat flux transferred from the plate surface to the suction air (q"). An irradiation level of 750 W/m$^2$ was used in the tests. Mass flux values of 0.02, 0.04, and 0.06 kg/s-m$^2$ were used. The tests were done within the same span of a few days, so slight variations in laboratory air temperature, which would affect the plate temperature and thus its infrared loss to the lab, applied to both plates. The variation in laboratory air temperature were small during the tests, and had a negligible effect on infrared radiation losses.

Experimental Results

Table 1 depicts the results of the tests.

TABLE 1

|  | G (kg/s-m$^2$) | $T_{amb}$ (°C.) | $T_{out}$ (°C.) | q" (W/m$^2$) |
|---|---|---|---|---|
| Plastic | 0.02 | 26.8 | 53.3 | 534 |
|  | 0.02 | 27.0 | 53.4 | 532 |
|  | 0.04 | 26.4 | 42.0 | 631 |
|  | 0.04 | 27.8 | 43.5 | 634 |
|  | 0.06 | 26.9 | 37.6 | 650 |
|  | 0.06 | 27.8 | 38.3 | 635 |
| Aluminum | 0.02 | 28.7 | 55.3 | 536 |
|  | 0.02 | 27.7 | 54.0 | 528 |
|  | 0.04 | 27.5 | 43.2 | 634 |
|  | 0.04 | 27.9 | 43.6 | 635 |
|  | 0.06 | 27.5 | 38.8 | 687 |
|  | 0.06 | 27.7 | 39.0 | 685 |

At 0.02 kg/s-m$^2$ mass flux, the plastic plate delivered an average heat flux of 533 W/$f^2$ to the suction air, compared to 532 W/m$^2$ average for the aluminum, a 0.2% increase over the average aluminum value. At 0.04 kg/sm$^2$, the plastic plate's average output was 633W/m$^2$, 0.3% less than the aluminum plate's average of 635 W/m$^2$. At 0.06 kg/s-m$^2$ the plastic plate's average output was 643 W/m², 6.3% lower than the aluminum plate's average of 686 W/m².

In addition to the experimental testing describe above, computer simulations were performed using computational fluid dynamics software to analyze the performance of unglazed transpired solar collector absorber plates with a wider range of properties.

Figure 3:
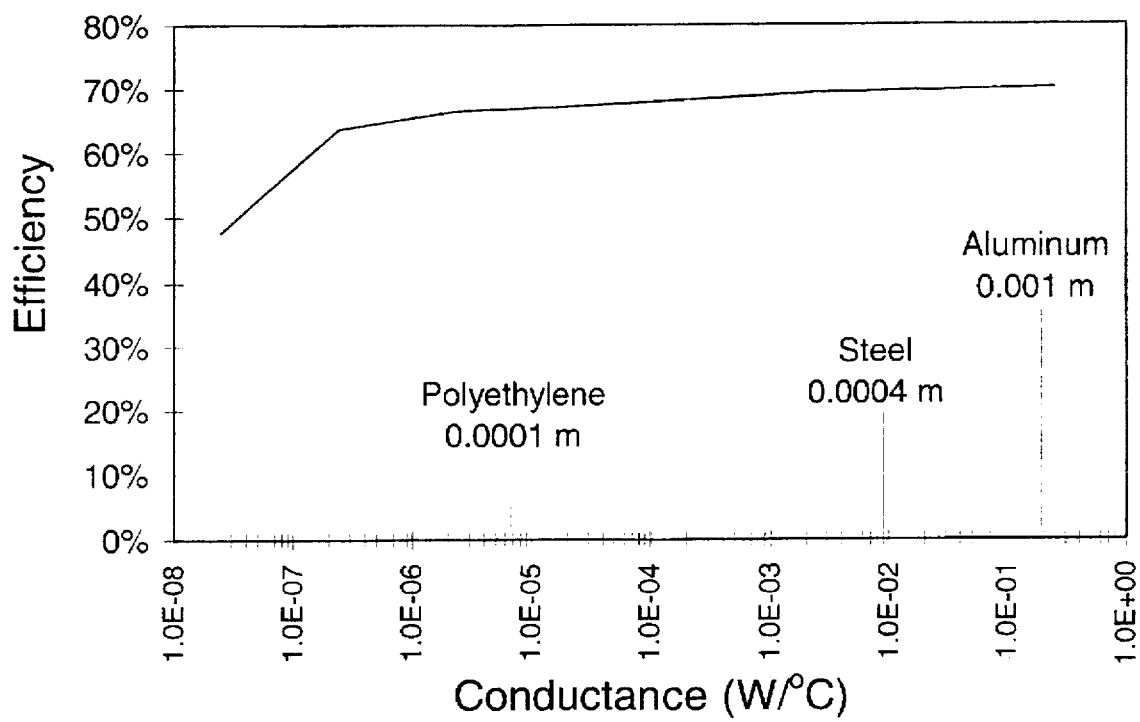
FIG. 3 is a graph showing the effect of absorber thermal conductance on collector operating efficiency.

Results from the computer model were compared with the experimental results, and then the computer model was used to evaluate the efficiency impacts of a very wide range of absorber thermal conductances. Simulations were performed for absorbers with a pitch of 0.0072 m and hole diameter of 0.00076 m (smaller holes, closer together than in the experimental plates described above) and a mass flux of 0.018 kg/s-m². The results (as shown in FIG. 3) indicate that compared to a base case with an absorber of typical aluminum sheeting ($c=2.2\times10^{-1}$ W/°C.) the efficiency for a thin polyethylene film ($c=3.3\times10^{-5}$ W/°C.) was reduced by less than 5%. For an absorber with conductance of $2.44\times10^{-7}$ W/°C., the efficiency was approximately 9% lower than for the base case, and for an absorber with conductance of $2.44\times10^{-8}$ W/°C., the efficiency was approximately 32% lower than for the base case. It is clear that absorbers having a thermal conductance of less than $1.0\times10^{-2}$ W/°C. can be efficient in unglazed transpired solar collectors. It is understood that the effect of absorber thermal conductance on efficiency will somewhat vary with various aspects of collector design such as flow rate and hole-to-hole spacing. For particular absorber designs such as the one illustrated in FIG. 3, extremely low values of thermal conductance (such as less than $1.0\times10^{-8}$ W/°C.) may lead to significantly reduced efficiencies.

The results show unexpectedly that thermal conductance (over a wide range of values) has only a modest effect on heat transfer to the suction air. Apparently, in the case of the low thermal-conductance absorber, there is sufficient heat transfer from the surface of the absorber through the boundary layer to the incoming air, so that high thermal conductance of the absorber and heat transfer at the holes is not as critical as previously thought. The finding that the efficiency of the unglazed transpired solar collector is relatively insensitive to low absorber thermal conductance means that a new range of materials can be considered for absorbers.

Therefore, the absorber plate of the instant invention may be formed of rigid or pliable or flexible sheet, foil, film, membrane, or fabric (either woven and nonwoven). The materials may be either single or multiply layers. Example materials include plastics, such as, but not limited to, polyethylene or styrene, metal foils, and porous materials such as open cell foam. Felt fabric may also be used. It is understood, however, that other low thermal-conductance materials can be effective. For example, thin metal foils having low thermal conductance because of their thinness can also be used successfully. It is also understood that although the front surface of the absorber is substantially flat or planar (that is not corrugated), the absorber itself can be curved or shaped to suit the particular application. For example, the absorber may be curved to cover crops for crop drying. One or both of the front and back surfaces of the absorber may be a dark color to absorb solar radiation. Surfaces may be treated or coated to have a low emittance for infrared radiation so that heat loss is reduced.

In the case of prior-art metal absorbers for unglazed transpired solar collectors, corrugated material had been used to provide structural rigidity. Thin, low thermal-conductance absorbers will likely utilize some sort of support structure or inflation and will, therefore, likely be uncorrugated, flat or substantially planar. Research indicates that, contrary to previous opinion, convective heat losses are typically lower for flat absorbers compared to corrugated absorbers. With high suction velocities and low crosswind speeds, there is little difference. However, at the lower suction velocities required for high delivered air temperatures, flow separation occurs over corrugated plates and convective heat loss is high relative to flat plates.

The absorber material may be perforated with holes over its surface using any known perforating method. An advantage of some low thermal-conductance absorber materials is that a wider range of perforating methods (such as laser perforating or hot punching) can be used for materials that are thinner or softer than typical high thermal-conductance absorber materials such as metal sheeting. It is understood that the distance between holes and the diameter of the individual holes can be varied.

The absorber also may be formed of porous materials with openings that are formed as part of the material as in the case of fabric. Openings for passage of air also may be added to the material by other well known methods and means.

The absorber material may be stretched or attached over various frames or supports including an inflatable support to suit the application. Absorber tension may be provided by springs, elastic cords or materials, weights, inflation, prestressing, or other well known means or methods. A mesh of wire, a honeycomb structure, or other material may be used to support the absorber or incorporated into the absorber. It can also be fixedly attached to a more permanent support structure. Any well known attachment method, such as bonding or spot welding may be used and reinforcement may also be used at the attachment points, or as part of the absorber material.

The front surface of the absorber may also have a thin film photosensitive semi-conductor layer to form a photovoltaic cell to convert some of the absorbed solar radiation into electrical energy. The absorber then can both heat the incoming air that is drawn through the perforations and produce electrical energy.

In use, the end of the air collection space or chamber is sealed except where a fan or other ducting is provided for the airstream. In operation, incoming air is drawn toward the surface of the absorber plate 5. The absorber plate 5 including its front surface 4 is heated by solar radiation. The air is heated as it flows towards the surface 4 and is then pulled through the perforations or openings in the absorber to form a suction airstream. The heated suction air is distributed for use. It is noted that the instant invention recognizes that heat is transferred to the incoming air primarily from the absorber surface and that the heat transferred during passage through the perforations unexpectedly is not a major factor in the overall result. The fan is typically used for suctioning the air and for the final heated air distribution.

Uses for the heated air include buildings, temporary structures and crop drying. Indeed, unglazed transpired solar collectors are useful whenever there is a need for heated outside air.

The foregoing description, therefore is considered as illustrative only as to the principles of the invention. Further since numerous modifications and changes will readily occur to those skilled in the art, it is not desired to limit the invention to the exact construction and process as described above. Accordingly, all suitable modifications and equivalents may be resorted to falling within the scope of the invention as defined by the claims as follows.

I claim:

1. An unglazed transpired solar collector using solar radiation to heat incoming air for distribution, comprising:

a) an unglazed absorber formed of material having a low thermal-conductance of less than $1.0 \times 10^{-2}$ W/°C. and a front surface for receiving the solar radiation; and b) openings in the unglazed absorber for passage of the incoming air; wherein the incoming air is heated as it is pulled towards the front surface of the absorber, and the heated air the heated air passes through the openings in the absorber for distribution.

2. The unglazed transpired solar collector of claim 1 wherein the absorber is formed of rigid low thermal-conductance material.

3. The unglazed transpired solar collector of claim 1 wherein the absorber is formed of flexible low thermal-conductance material.

4. The unglazed transpired solar collector of claim 1 wherein the low thermal-conductance material is plastic.

5. The unglazed transpired solar collector of claim 5 wherein the low thermal-conductance material is film.

6. The unglazed transpired solar collector of claim 1 wherein the low thermal-conductance material is metal foil.

7. The unglazed transpired solar collector of claim 1 wherein the low thermal-conductance material is woven fabric.

8. The unglazed transpired solar collector of claim 1 wherein the low thermal-conductance material is unwoven fabric.

9. The unglazed transpired solar collector of claim 1 wherein the low thermal-conductance material is perforated.

10. The unglazed transpired solar collector of claim 1 wherein the low thermal-conductance material is open cell foam.

11. The unglazed transpired solar collector of claim 1 further comprising:

a) an air collection chamber for receiving the heated air; and b) means for distributing the heated air from the air collection chamber.

12. The unglazed transpired solar collector of claim 1 wherein the front surface of the absorber is substantially flat.

13. The unglazed transpired solar collector of claim 1 wherein the front surface of the absorber is of a dark color to absorb solar radiation.

14. The unglazed transpired solar collector of claim 1 wherein the front surface of the absorber has a low emittance to minimize infrared radiation heat losses.

15. The unglazed transpired solar collector of claim 1 wherein the absorber comprises a back surface and the back surface has low emittance to minimize infrared heat losses.

16. The unglazed transpired solar collector of claim 1 wherein the absorber comprises a wall of the air collection chamber.

17. The unglazed transpired solar collector of claim 16 wherein the air collection chamber comprises at least one surface having low emittance to infrared radiation.

18. The unglazed transpired solar collector of claim 1, wherein the low thermal-conductance material is a membrane.

19. An absorber for an unglazed transpired solar collector comprising porous material with a low thermal-conductance of less than $1.0 \times 10^{-2}$ W/°C.

20. The absorber of claim 1 further comprising a thin film layer on the front surface of the absorber to form a photovoltaic cell to convert some of the solar radiation into electrical energy.

* * * * *